Figure 1:
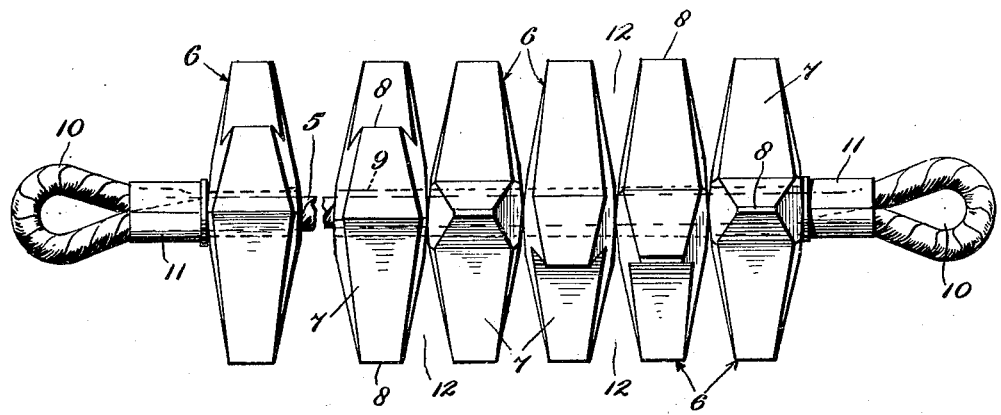

July 23, 1929.  A. R. SHERWOOD  1,721,978
DEVICE FOR STOPPING AUTOMOBILES
Filed Jan. 28, 1928

INVENTOR.
Albert R. Sherwood,
BY Robert M. Zacharias
ATTORNEY.

Patented July 23, 1929.

1,721,978

UNITED STATES PATENT OFFICE.

ALBERT R. SHERWOOD, OF BELMONT, NEW YORK.

DEVICE FOR STOPPING AUTOMOBILES.

Application filed January 28, 1928. Serial No. 250,255.

This invention relates to a device for stopping automobiles and the like, and has for one of its objects the provision of an implement especially adapted to be thrown in the path of a pneumatic tired vehicle, by an officer of the law, for the purpose of puncturing one or more of the tires, whereby the occupant may be forced to bring the vehicle to a stop.

A further object of the invention is to provide a device of the character described comprising a flexible supporting member and a plurality of tire puncturing members carried thereby, which may be easily carried by an officer, and which may be readily thrown by him for considerable distances, in the event he is not in the most favorable position for disposing the device in the path of the vehicle.

A still further object of the invention is to provide a device of the class described which will be simple in construction, comparatively inexpensive to manufacture, and more efficient in use than those which have been heretofore proposed.

With the above and other objects in view, which will appear as the description proceeds, the invention consists in the novel details of construction, and combinations and arrangements of parts more fully hereinafter described, and particularly pointed out in the appended claims.

Referring to the accompanying drawing forming a part of this specification in which like reference characters designate like parts in all the views:—

Figure 2:
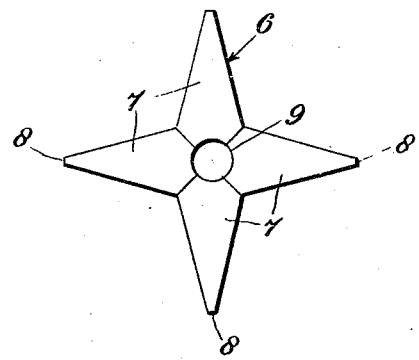

Figure 1 is a side elevational view, partly broken away, of a device constructed in accordance with the present invention; and Fig. 2 is an end elevational view of one of the tire puncturing elements.

As will be readily understood from the said drawing, the device comprises a flexible supporting member 5, which may take the form of a wire or hemp rope or cable, upon which is loosely mounted a plurality of tire puncturing members 6. These said members are formed with a plurality of tapering points or prongs 7, the outer ends of which terminate comparatively sharply, as indicated at 8, for facilitating the piercing of the tire casing. The members 6 are provided with bores 9, which are of somewhat larger diameter than that of the cable 5, whereby the said members may be freely slid upon the cable in the process of manufacture, and may freely revolve thereon when the device is completed.

The members 6 may be retained upon the cable in any suitable manner, as for example, by turning the ends of the cable upon itself, forming bights or loops 10, with the extreme ends being secured as by cable clamps 11, or in any other suitable manner. The said bights or loops 10 constitute a convenient means for gripping the device in the act of throwing it into the path of a vehicle; and if it is desired to attach the device to a longer rope or cable to facilitate its use, one of the said bights may receive the end of such longer cable. When such longer cable is employed, it may be wound within the V-shaped grooves 12 formed between the tapering points 7, when the device is not in use.

The manner of using the device will be clear from the foregoing, it being understood that when an officer wishes to halt a vehicle, the occupant of which has refused to stop, the implement is thrown in the path of the vehicle in such manner that it is engaged by one or more of the tires of the vehicle, which are pierced by the sharpened edges 8 of the points 7, permitting the air to escape from the said tires. This is usually effective in causing the occupant to bring the vehicle to an immediate stop.

While one form of the invention has been illustrated and described, it is obvious that those skilled in the art may vary the precise details of construction, as well as the arrangement of parts, without departing from the spirit of the invention, and therefore it is not wished to be limited to the above disclosure, except as may be required by the claims.

What I claim is:—

1. A missile comprising a flexible supporting member; and a plurality of tire piercing members rotatably mounted thereon.

2. A missile comprising a flexible supporting member; a plurality of tire piercing members rotatably carried thereby; and means for preventing the displacement of said piercing members.

3. A missile comprising an elongated flexible supporting member; a plurality of tire piercing members rotatably mounted thereon, each provided with a plurality of tire piercing prongs; and means for retaining said piercing members in place on said supporting member.

4. A device of the class described, comprising a flexible cable; a plurality of tire piercing members rotatably mounted side by side upon said cable, each having a plurality of radially extending sharpened tire piercing prongs; and means for retaining said members in place upon said cable.

5. A device of the class described, comprising a flexible cable; and a plurality of tire piercing members rotatably mounted side by side upon said cable, each having a plurality of radially extending sharpened tire piercing prongs, the ends of said cable being looped and secured to provide gripping portions, and to prevent axial displacement of said members.

In testimony whereof I affix my signature.

ALBERT R. SHERWOOD.